(12) United States Patent
D'Angelico et al.

(10) Patent No.: US 10,641,736 B2
(45) Date of Patent: May 5, 2020

(54) APPARATUS FOR DETERMINING AND/OR MONITORING AT LEAST ONE PROCESS VARIABLE OF A MEDIUM

(71) Applicant: Endress+Hauser GmbH+Co. KG, Maulburg (DE)

(72) Inventors: Sascha D'Angelico, Rümmingen (DE); Christoph Schmitt, Schopfheim (DE)

(73) Assignee: Endress+Hauser SE+Co. KG, Maulburg (DE)

( * ) Notice: Subject to any disclaimer, the term of this patent is extended or adjusted under 35 U.S.C. 154(b) by 217 days.

(21) Appl. No.: 15/549,855

(22) PCT Filed: Jan. 27, 2016

(86) PCT No.: PCT/EP2016/051707
§ 371 (c)(1),
(2) Date: Aug. 9, 2017

(87) PCT Pub. No.: WO2016/128217
PCT Pub. Date: Aug. 18, 2016

(65) Prior Publication Data
US 2018/0024097 A1 Jan. 25, 2018

(30) Foreign Application Priority Data
Feb. 10, 2015 (DE) .................. 10 2015 101 891

(51) Int. Cl.
*G01N 29/02* (2006.01)
*G01F 23/296* (2006.01)
(Continued)

(52) U.S. Cl.
CPC ......... *G01N 29/022* (2013.01); *G01F 1/8436* (2013.01); *G01F 23/2967* (2013.01);
(Continued)

(58) Field of Classification Search
CPC ...... G01N 9/002; G01N 11/16; G01N 29/022; G01N 2009/006; G01N 2291/02818; G01F 23/28; G01F 23/296; G01F 23/2966
(Continued)

(56) References Cited

U.S. PATENT DOCUMENTS

| 4,420,983 A | 12/1983 | Langdon |
| 5,373,745 A | 12/1994 | Cage |

(Continued)

FOREIGN PATENT DOCUMENTS

| CN | 101517382 A | 8/2009 |
| CN | 102177421 A | 9/2011 |

(Continued)

OTHER PUBLICATIONS

Search Report for International Patent Application No. PCT/EP2016/051707, WIPO, dated Jun. 30, 2016, 14 pp.

*Primary Examiner* — Benjamin R Schmitt
(74) *Attorney, Agent, or Firm* — Mark A. Logan; PatServe

(57) ABSTRACT

An apparatus for determining and/or monitoring at least a first process variable of a medium and method for operating the apparatus at least with an electronics unit and a sensor unit, wherein the electronics unit is embodied to supply the sensor unit with an excitation signal, which is composed of an excitation carrier signal with an excitation carrier frequency and an excitation modulation signal with an excitation modulation frequency, and to receive from the sensor unit a received signal, which is composed of a received carrier signal and a received modulation signal, and wherein the electronics unit is embodied to determine from the phase shift between the excitation modulation signal and the received modulation signal at least the first process variable.

15 Claims, 3 Drawing Sheets

(51) Int. Cl.
- *G01N 9/00* (2006.01)
- *G01N 11/16* (2006.01)
- *G01F 1/84* (2006.01)
- *G01N 29/024* (2006.01)

(52) U.S. Cl.
CPC ............ *G01N 9/002* (2013.01); *G01N 11/16* (2013.01); *G01N 29/024* (2013.01); *G01N 2009/006* (2013.01); *G01N 2291/012* (2013.01); *G01N 2291/02818* (2013.01); *G01N 2291/0427* (2013.01)

(58) Field of Classification Search
USPC .............................................. 73/32 A, 290 V
See application file for complete search history.

(56) References Cited

U.S. PATENT DOCUMENTS

| | | | | |
|---|---|---|---|---|
| 2006/0186897 | A1* | 8/2006 | Niemann | G01N 11/16 324/633 |
| 2009/0205411 | A1* | 8/2009 | Muller | G01F 23/2967 73/64.53 |
| 2010/0223019 | A1* | 9/2010 | Griessbaum | G01F 23/284 702/75 |
| 2011/0203388 | A1* | 8/2011 | Kitami | G01F 1/8431 73/861.356 |
| 2012/0174671 | A1* | 7/2012 | Urban | G01F 23/296 73/579 |

FOREIGN PATENT DOCUMENTS

| | | |
|---|---|---|
| DE | 10050299 A1 | 4/2002 |
| DE | 10057974 A1 | 5/2002 |
| DE | 102004050494 A1 | 5/2006 |
| DE | 102005007544 A1 | 8/2006 |
| DE | 102005015547 A1 | 10/2006 |
| DE | 102006033819 A1 | 1/2008 |
| DE | 102006034105 A1 | 1/2008 |
| DE | 102007013557 A1 | 2/2008 |
| DE | 102007043811 A1 | 3/2009 |
| DE | 102009026685 A1 | 12/2010 |
| DE | 102009028022 A1 | 2/2011 |
| DE | 102010030982 A1 | 1/2012 |
| DE | 102011088351 A1 | 6/2013 |

* cited by examiner

APPARATUS FOR DETERMINING AND/OR MONITORING AT LEAST ONE PROCESS VARIABLE OF A MEDIUM

CROSS-REFERENCE TO RELATED APPLICATIONS

The present application is related to and claims the priority benefit of German Patent Application No. 10 2015 101 891.8, filed on Feb. 10, 2015 and International Patent Application No. PCT/EP2016/051707, filed Jan. 27, 2016, the entire contents of which are incorporated herein by reference.

TECHNICAL FIELD

The invention relates to an apparatus for determining and/or monitoring at least one process variable of a medium at least with an electronics unit and a sensor unit as well as to a method for operating the apparatus. The medium is located, for example, in a container, in a tank, or also in a pipeline.

BACKGROUND

Applied in process- and/or automation technology are many different field devices for determining and/or monitoring at least one process variable, especially a physical or chemical, process variable. Involved in such case, are, for example, fill level measuring devices, flow measuring devices, pressure- and temperature measuring devices, pH-redox potential measuring devices, conductivity measuring devices, etc., which register the corresponding process variables, fill level, flow, pressure, temperature, pH-value, and conductivity, respectively. A field device typically includes at least one sensor unit, which at least partially and at least at times comes in contact with the process, and an electronics unit, which serves, for example, for signal registration,—evaluation and/or—feeding. Referred to as field devices in the context of the present invention are, in principle, all measuring devices, which are applied near to the process and which deliver, or process, process relevant information, thus also remote I/Os, radio adapters, and, generally, electronic components, which are arranged at the field level. A large number of such field devices are produced and sold by the firm, Endress+Hauser. Applied for registering the respective process variables are many different measuring principles, which are known from a large number of publications. To discuss separately and in detail each field device, for which the solution of the invention is appropriate, would be more than necessary. Thus, the following description focuses on fill level measuring devices with an oscillatable unit, wherein, at suitable locations, reference is made to other possible applications of the solution of the invention.

Such field devices, also referred to as vibronic sensors, have, especially in the case of fill-level measuring devices, for example, an oscillatory fork, single rod or membrane as the mechanically oscillatable unit. This is excited during operation by means of a driving/receiving unit, usually in the form an electromechanical transducer unit, to execute mechanical oscillations. The transducer unit can be, for example, a piezoelectric drive or an electromagnetic drive. In the case of flow measuring devices with at least one oscillatable unit, such can, however, also be embodied as an oscillatable tube, through which the medium flows, an example of such being a measuring device working according to the Coriolis principle.

Corresponding field devices are produced by the applicant in great variety and, in the case of fill-level measuring devices, sold, for example, under the marks, LIQUIPHANT and SOLIPHANT. The underpinning measuring principles are basically known. On the one hand, the driving/receiving unit excites the mechanically oscillatable unit by means of an electrical excitation signal to execute mechanical oscillations. On the other hand, the driving/receiving unit receives the mechanical oscillations of the mechanically oscillatable unit and converts them into an electrical, received signal. The driving/receiving unit is, correspondingly, either a separate drive unit and a separate receiving unit, or a combined driving/receiving unit.

For exciting the mechanically oscillatable unit, the most varied of both analog as well as also digital methods have been developed. In many cases, the driving/receiving unit is part of a feedback, electrical, oscillatory circuit, by means of which the exciting of the mechanically oscillatable unit to execute mechanical oscillations occurs. For a resonant oscillation, for example, the amplification factor must be $\geq 1$, and the oscillatory circuit condition, according to which all phases arising in the oscillatory circuit add up to a multiple of 360°, must be fulfilled.

For fulfilling the oscillatory circuit condition, a certain phase shift between the excitation signal and the received signal must be assured. The most varied of solutions are known for this. In principle, the adjusting of the phase shift can be accomplished, for example, using a suitable filter, or also by means of a control loop controlled to provide a predeterminable phase shift, the desired value. Known from DE102006034105A1, for example, is use of a tunable phase shifter. The additional integration of an amplifier with adjustable amplification factor for additional control of the oscillation amplitude is, in contrast, described in DE102007013557A1. DE102005015547A1 uses an all-pass filter. The adjusting of the phase shift is, moreover, possible by means of frequency search operation, such as, for example, disclosed in DE102009026685A1, DE102009028022A1, and DE102010030982A1. The phase shift can, however, also be controlled to a predeterminable value by means of a phase locked loop. Such an excitation method is subject matter of DE001O2010030982A1.

Both the excitation signal as well as also the received signal are characterized by frequency, amplitude and/or phase. Changes in these variables are usually taken into consideration for determining the particular process variable, such as, for example, a predetermined fill level of a medium in a container, or also the density and/or viscosity of a medium or in the case of a flow measuring device the flow of a medium through a tube or pipe. In the case of a vibronic limit level switch for liquids, it is, for example, distinguished, whether the oscillatable unit is covered by the liquid or freely oscillating. These two states, the free state and the covered state, are, in such case, distinguished, for example, based on different resonance frequencies, thus a frequency shift.

Density and/or viscosity can, in turn, be ascertained with such a measuring device only when the oscillatable unit is covered by the medium. Known from DE10050299A1, DE102006033819A1 and DE102007043811A1 is to determine the viscosity of a medium based on the frequency-phase curve ($\Phi=g(f)$). This procedure is based on the dependence of the damping of the oscillatable unit on the viscosity of the involved medium. In order to eliminate the influence of density on the measuring, viscosity is determined based on a frequency change caused by two different values for the phase, thus by means of a relative measurement.

For determining and/or monitoring the density of a medium, in contrast, according to DE10057974A1, the influence of at least one disturbing variable, for example, the viscosity, on the oscillation frequency of the mechanically oscillatable unit is ascertained and compensated. In DE102006033819A1, it is, furthermore, disclosed to set a predeterminable phase shift between the excitation signal and the received signal, in the case of which effects from changes of the viscosity of the medium on the mechanical oscillations of the mechanically oscillatable unit are negligible. At this phase shift, an empirical formula for determining the density can be set up.

In order to register different process variables with a certain field device, thus, in each case, different embodiments and methods must be applied for operating the field device. Even when a number of process variables are determinable by means of a field device, in many cases the determining of a first process variable must be interrupted, in order to be able to determine a second process variable. It would, however, be desirable, when by means of one field device a number of process variables would be simultaneously and continuously determinable without mutual influencing.

SUMMARY

Therefore, an object of the present invention is to provide an apparatus as well as a method for operating the apparatus for determining and/or monitoring at least one process variable, wherein at least one other piece of information, e.g. another physical or chemical variable or process variable, can be ascertained.

This object is achieved according to the invention by an apparatus for determining and/or monitoring at least a first process variable of a medium, comprising an electronics unit and a sensor unit, wherein the electronics unit is embodied to supply the sensor unit with an excitation signal, which is composed of an excitation carrier signal with an excitation carrier frequency and an excitation modulation signal with an excitation modulation frequency, and to receive from the sensor unit a received signal, which is composed of a received carrier signal and a received modulation signal, and wherein the electronics unit is embodied to determine from the phase shift between the excitation modulation signal and the received modulation signal at least the first process variable. Since the excitation signal is composed of an excitation carrier signal and an excitation modulation signal, the received carrier signal and the received modulation signal can be evaluated independently of one another. Thus, a number of channels are possible for evaluation of the received signal received by the sensor unit by means of a field device. The modulation, preferably an amplitude modulation, does not influence an evaluation of the carrier signal. Advantageously, the excitation modulation frequency is small relative to the excitation carrier frequency.

In a preferred further development of the invention, the electronics unit is embodied to determine from the phase shift between the excitation carrier signal and the received carrier signal at least a second process variable. It is understood, however, that also more than two process variables are determinable. A first process variable is thus calculated from the received modulation signal, e.g. from the phase shift between the excitation modulation signal and the received modulation signal, and a second process variable is calculated from the received carrier signal. The second process variable can then be calculated, for example, from the excitation carrier frequency, such as, among others, in the case of determining a fill level, for example, by means of a LIQUIPHANT instrument, from the amplitude of the received carrier signal or from the phase shift between the excitation carrier signal and the received carrier signal. The two process variables are determinable by means of an apparatus of the invention advantageously without mutual influencing.

In a preferred further development of the invention, the sensor unit includes at least one mechanically oscillatable unit, especially an oscillatory fork, single rod, or membrane. It can, however, also comprise an oscillatably held tube. The apparatus is thus a vibronic sensor, either a fill-level measuring device or a flow measuring device.

Advantageously, the electronics unit is embodied to determine and/or to monitor a predetermined fill level, density or viscosity of a medium. The first or second process variable can thus especially be a predetermined fill level, density or viscosity.

In an embodiment of the invention, the phase shift between the excitation carrier signal and received carrier signal is controlled to a predeterminable value. For example, the predeterminable phase shift can be controlled in such a manner that the oscillatable unit executes a resonant oscillation. For example, this can correspond to a phase shift of 90°. For determining density, it is, in turn, advantageous to control the phase shift in such a manner that it corresponds to the so-called viscosity independence angle, which is, for example, 45° for a LIQUIPHANT instrument.

An especially preferred embodiment of the invention provides that the electronics unit is embodied to ascertain a damping from the phase shift between the excitation modulation signal and the received modulation signal. The phase shift between the excitation modulation signal and the received modulation signal depends on the excitation carrier frequency, the excitation modulation frequency and the damping. Since the first two variables are known, the damping can be determined. In the case of a vibronic sensor, the damping is composed, for example, of the inner damping of the oscillatable unit and the outer damping, which is brought about by the oscillatory movement of the oscillatable unit in a medium. The outer damping depends on the viscosity of the medium and can correspondingly be ascertained in the case of known inner damping. Conversely, in the case of known outer damping, the inner damping can be ascertained, which depends on the state of the sensor and can indicate the occurrence of accretion formation, corrosion or even aging effects. Now, it is true that the inner damping is usually small relative to the total damping. Therefore, it is, by way of simplification, likewise possible to take into consideration the inner damping as a typical value for calculating the outer damping. In this case, the viscosity can even be ascertained without an individually determined value for the inner damping.

It is correspondingly advantageous to embody the electronics unit to ascertain from the damping at least the viscosity of the medium. In a preferred embodiment of the invention, the phase shift between the excitation modulation signal and received modulation signal is controlled to 45° by adjusting the excitation modulation frequency. In this way, the damping can be determined with reduced calculational effort, such as will be explained below in connection with the description of the figures.

The object of the invention is, moreover, achieved by a method for determining and/or monitoring at least a first process variable of a medium at least with an electronics unit and a sensor unit, wherein the sensor unit is supplied with an excitation signal, which is composed of an excitation carrier signal with an excitation carrier frequency and an excitation modulation signal with an excitation modulation frequency, wherein a received signal is received, which is composed of a received carrier signal and a received modulation signal, and wherein from the phase shift between the excitation modulation signal and the received modulation signal at least the first process variable is determined. The method of the invention enables, thus, evaluation of a received carrier signal and a received modulation signal independently of one another. The modulation, preferably an amplitude modulation, does not influence an evaluation of the carrier signal. Advantageously, the excitation modulation frequency is small relative to the excitation carrier frequency.

In the case of the method of the invention, it is advantageous to determine from the received carrier signal at least a second process variable.

Advantageously, a predetermined fill level of the medium in the container or the flow of a medium through a pipeline is determined and/or monitored. One of these variables is then especially the first or second process variable.

A further development of the method of the invention provides that the phase shift between the excitation carrier signal and received carrier signal is controlled to a predeterminable value. The value of the predeterminable phase shift is especially selected in such a manner that the oscillatable unit executes resonant oscillations, or in such a manner that the predeterminable phase shift corresponds to the viscosity independence angle.

Advantageously, damping is determined from the phase shift between the excitation modulation signal and the received modulation signal. In the case of a vibronic sensor, the damping is composed, for example, of the inner damping of the oscillatable unit and the outer damping, which is brought about by the oscillatory movement of the oscillatable unit in a medium.

Likewise advantageously, at least the viscosity of the medium is ascertained from the damping. Thus, a predetermined fill level or the density and the viscosity can be continuously determined by means of a vibronic fill-level measuring device. The opportunity, continuously to determine a predetermined fill level and the viscosity offers, moreover, compared with usual methods of the state of the art, such as those described above, the advantage that the sensor oscillation does not have to be always restarted. Thus, in comparison to these prior methods, oscillation termination is experienced only at clearly higher viscosites of the medium. Furthermore, in the case of the solution of the invention, the actual resonant oscillation, that is the oscillation brought about by the excitation carrier signal, is not influenced by the modulation oscillation, by means of which the density, or the viscosity, is determined and which is excited by the excitation modulation signal.

Finally, the phase shift between the excitation modulation signal and received modulation signal can advantageously be controlled to 45° by adjusting the excitation modulation frequency. This leads to a reduced calculational effort, such as indicated below in the description of the figures.

BRIEF DESCRIPTION OF THE DRAWINGS

The invention as well as its advantageous embodiments will now be described in greater detail based on the appended drawing, the FIGS. 1-4 of which show as follows.

DETAILED DESCRIPTION

Figure 1:
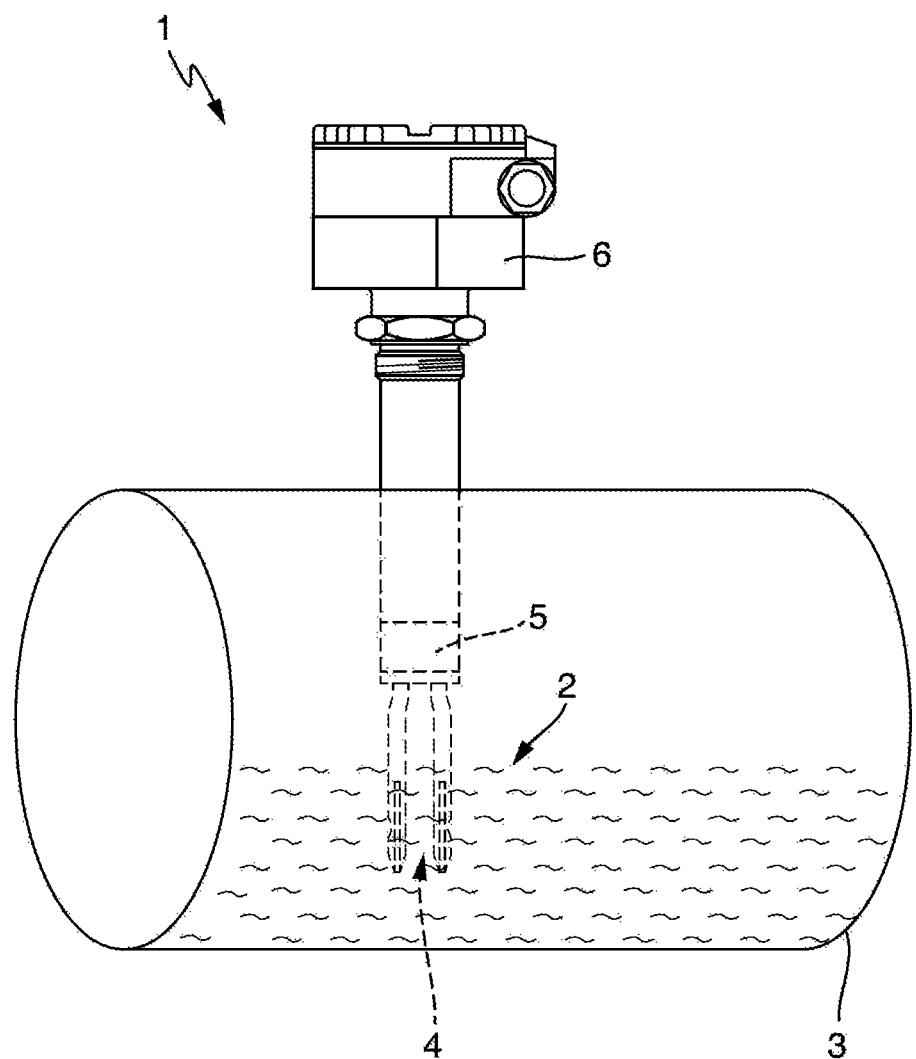
FIG. 1 shows a schematic view of a vibronic sensor according to the state of the art.

FIG. 1 shows a vibronic fill-level measuring device 1. A sensor unit 2 with a mechanically oscillatable unit 4 in the form an oscillatory fork protrudes partially into a medium 3, which is located in a container. The oscillatable unit 4 is excited by means of the excitation-/receiving unit 5 to execute mechanical oscillations, and can be, for example, a piezoelectric stack- or bimorph drive. Also other embodiments of a vibronic fill-level measuring device can be used. Furthermore, an electronics unit 6 is shown, which performs signal registration,—evaluation and/or—feeding.

Figure 2A:
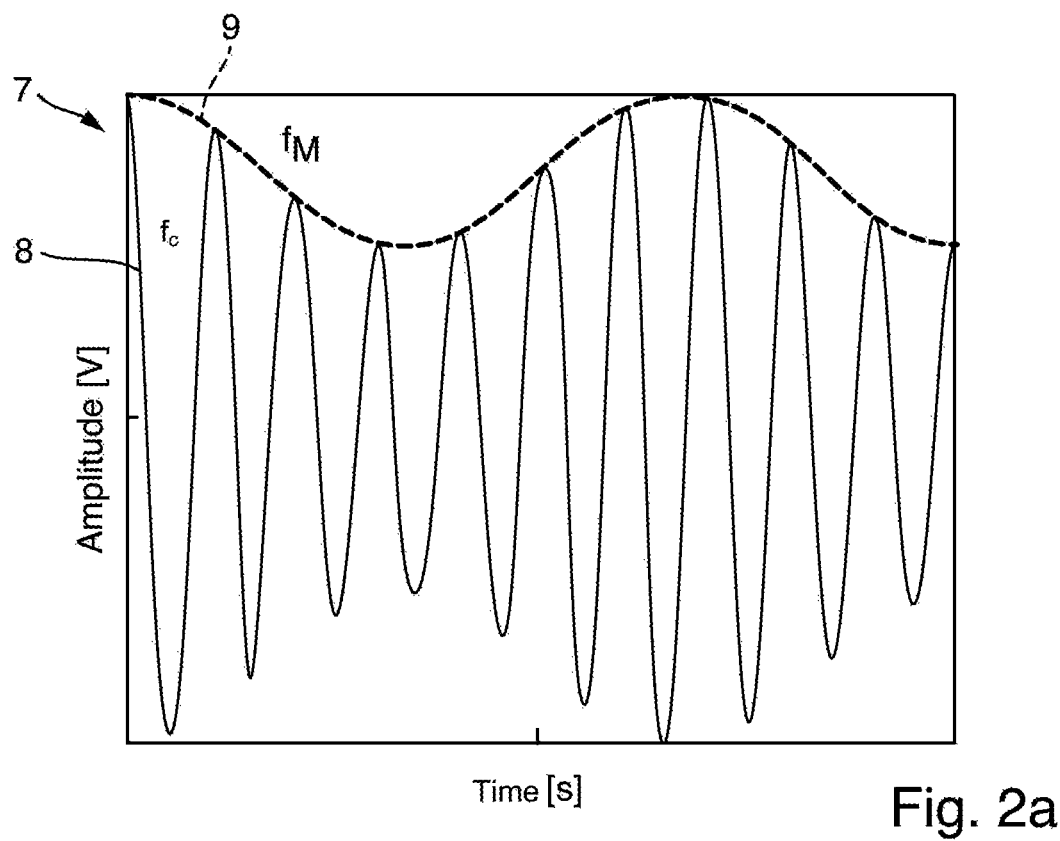
FIG. 2(a) shows the excitation carrier signal as a function of time.
Figure 2B:
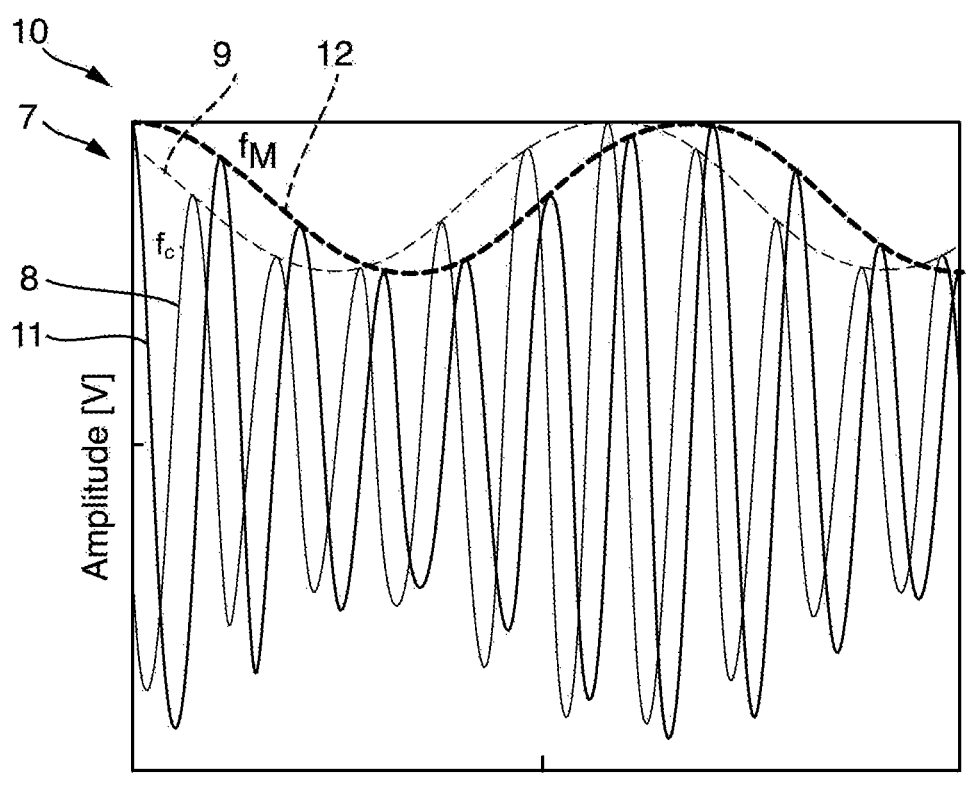
FIG. 2(b) shows the excitation carrier signal and the received carrier signal as a function of time.

The excitation signal 7 for driving the oscillatable unit 4 is, according to the invention, composed of an excitation carrier signal 8 and an excitation modulation signal 9, and is shown, by way of example, in FIG. 2a as a function of time. The excitation modulation signal 9 with the excitation modulation frequency $f_M$ is visible as the envelope of the excitation carrier signal 8 with the excitation carrier frequency $f_C$. The received signal 10 received from the oscillatable unit 4 is shown in FIG. 2b together with the excitation signal 7, likewise as a function of time. The received signal 10 is likewise composed of two parts, the received carrier signal 11 and the received modulation signal 12. While the frequencies of the excitation carrier signal 8 and excitation modulation signal 9 do not change, the received signal 10 has an amplitude different from the amplitude of the excitation signal 7. Moreover, there occurs between the excitation signal 7 and the received signal 10 a phase shift, both with regard to the carrier signals (8,11) as well as also with regard to the modulation signals (9,12).

In the following, it will be explained why the damping of the oscillatable unit 4 can be ascertained by means of the amplitude modulation of the excitation signal 7. For this, a mathematical description of the oscillatory movement of the oscillatable unit 4 is needed. Depending on which geometry and which boundary conditions are selected, different equations can be set up. However, the calculation becomes quickly extensive, because of which in the following a very simplified representation is selected, namely that of the oscillatable unit 4 as an ideal damped harmonic oscillator with the transfer function G(s):

$$G(s) = \frac{V}{\left(\frac{1}{\omega 0} \cdot s\right)^2 + 2 \cdot D \cdot \frac{1}{\omega 0} \cdot s + 1} = \frac{V \cdot \omega 0^2}{(s-s1) \cdot (s-s2)}$$

In such case, the following definitions hold: V is the amplification at the angular frequency $\omega=0$, D the damping, $\omega 0$ the resonant frequency in the undamped case and s1 and s2 are, in the case of oscillation, which means in the case, in which D<1, given by:

$$s1 = \omega 0 \cdot (i\sqrt{1-D^2} - D),\ s2 = \omega 0 \cdot (-i\sqrt{1-D^2} - D).$$

The excitation signal 7 L(t), such as shown in FIG. 2a, can be expressed mathematically as $$L(t) = AmpC \cdot \cos(\omega C \cdot t) \cdot [(mo) \cdot \cos(\omega M \cdot t) + 1]$$

wherein AmpC and ωC are the amplitude and the frequency of the carrier signal, and mo and ωM are the amplitude and the angular frequency of the modulation signal.

In order to calculate the system response of the oscillatable unit 4 to the excitation signal 7, the excitation signal 7 is decomposed by means of partial-fraction decomposition into three summands. For each summands, then a Laplace transformation can be performed and the system response individually calculated. For a resonant exciting, thus for the case in which ωC=ω0, which implicitly means a phase shift between the excitation carrier signal and received carrier signal of 90°, there results then, except for possible transient oscillation phenomena, the total system response. Based on the inverse transformed system response, the phase shift between the excitation modulation signal and the received modulation signal can, in turn, be calculated from the complex amplitude $$\varphi = \operatorname{atan}\left(\frac{\operatorname{Imag}(G)}{\operatorname{Real}(G)}\right)$$

The modulation oscillation of the system response GL_mod is $$\mathrm{GL\_mod}(t) = C1 \cdot \left[ \frac{\left[\frac{\omega 0^2 - (\omega 0 - \omega M)^2 + 2 \cdot}{D \cdot \omega 0 \cdot (\omega 0 - \omega M)}\right] \cdot (1 - i)}{\frac{[\omega 0^2 - (\omega 0 - \omega M)^2]^2}{\omega 0^2} + 4 \cdot D^2 \cdot (\omega 0 - \omega M)^2} + \frac{\left[\frac{\omega 0^2 - (\omega 0 + \omega M)^2 + 2 \cdot}{D \cdot \omega 0 \cdot (\omega 0 + \omega M)}\right] \cdot (1 + i)}{4 \cdot D^2 \cdot (\omega 0 + \omega M)^2 + \frac{[(\omega 0 + \omega M)^2 - \omega 0^2]^2}{\omega 0^2}} \right] \cos(t \cdot \omega M)$$

with $$C1 = \frac{1}{2} \cdot V \cdot AmpC \cdot mo,$$

and the phase shift is $$\varphi(D) := \operatorname{atan}\left[\frac{2 \cdot \left[\frac{(D-1) \cdot \omega M^4 + 4 \cdot \omega 0^2 \cdot (1 - D^3) \cdot}{\omega M^2 + 4 \cdot D^2 \cdot \omega 0^4 (D+1)}\right]}{\omega 0 \cdot \omega M \cdot \left[\frac{-8 \cdot D^3 \cdot \omega 0^4}{\omega M^2} + \left(D^2 - \frac{3}{2} \cdot D - 1\right) \cdot 8D\omega 0^2 + \left(D^2 + \frac{3}{2} \cdot D - 1\right) \cdot \omega M^2 + \frac{\omega M^4}{\omega 0^2}\right]}\right]$$

This equation can be significantly simplified, when one assumes that the frequency of the modulation oscillation is significantly less than the resonant frequency of the oscillatory system in the undamped case, thus under the condition ωM<<ω0:

$$\varphi = \operatorname{atan}\left(-\frac{\omega M}{\omega 0 \cdot D}\right)$$

By transforming, one obtains for the damping of the oscillatable unit at resonant excitation $$D = \frac{-\omega M}{\tan(\varphi) \cdot \omega 0}$$

Another simplification can be achieved, when the phase shift between the excitation modulation signal 9 and the received modulation signal 12 is set to 45° by adjusting the excitation modulation frequency; in this case, the damping becomes $$D = \frac{\omega M}{\omega 0}$$

For any frequencies of the carrier signal where ωC≠ω0, the consideration is more complicated.

Figure 3:
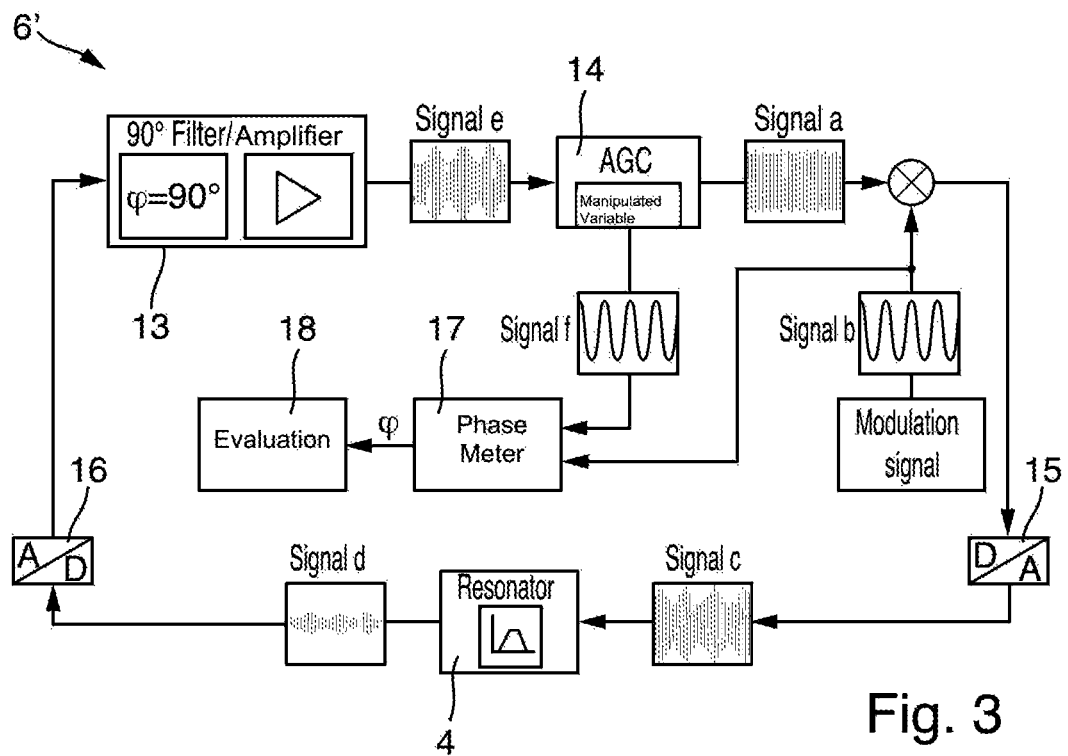
FIG. 3 shows a block diagram of an electronics unit of the invention.
Figure 4:
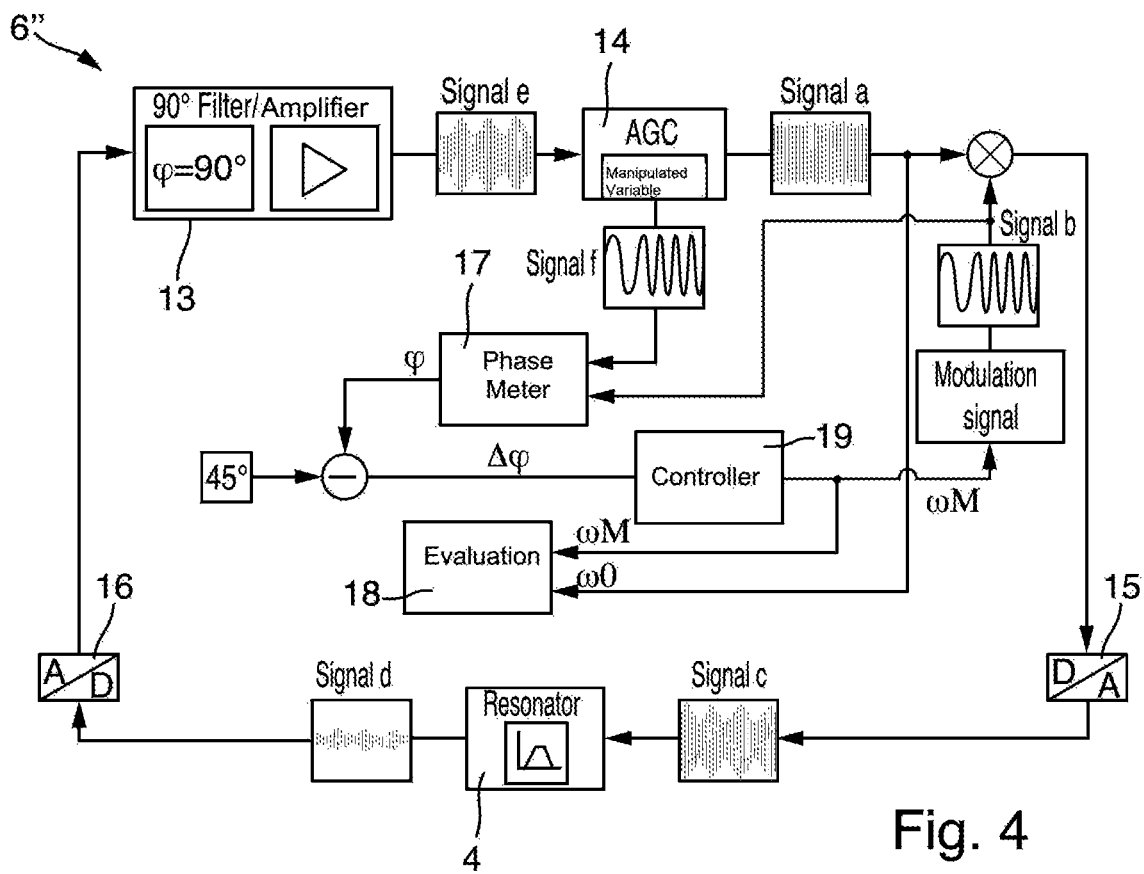
FIG. 4 shows a block diagram of a second embodiment of an electronics unit of the invention.

FIGS. 3 and 4 show, finally, two block diagrams with two possible embodiments for electronics units 6' and 6" of the invention for a vibronic fill-level measuring device.

In the case of the embodiment shown in FIG. 3, the oscillatable unit 4 is excited by means of an electromechanical transducer unit 5 (not shown), which is part of a feedback, oscillatory circuit, for which the phase shift between the excitation carrier signal 8 and received carrier signal 10 is set by means of a filter (90°-filter) and an amplifier 13 and an automatic amplifier control (AGC) 14. With the modulation oscillation, which is, simultaneously, the manipulated variable of the control loop, the damping of the oscillatory system can be ascertained.

The frequency $f_C$ of the excitation carrier signal 8, respectively the carrier oscillation, (signal a) establishes itself within the oscillatory circuit in accordance with the oscillatory circuit condition. Modulated onto this signal is the excitation modulation signal 9 (signal b) with the excitation modulation frequency $f_M$. From this there results the total excitation signal c, which is supplied to the oscillatable unit 4 after first passing through a digital-analog converter 15. The received signal 10 (signal d) then received from the oscillatable unit 4 is identical with the excitation signal 7 (signal c) as regards carrier frequency $f_C$ and modulation frequency $f_M$. However, the excitation signal 7 (signal c) and the received signal 10 (signal d) differ as regards amplitudes. Moreover, phase shifts are present between the two signals, both with reference to the carrier signals 8,11 and with reference to the modulation signals 9,12.

After passing through an analog-digital converter 16, the received signal 10 (signal d) reaches the unit 13 composed of 90°-filter and amplifier. The phase shift of the resonance oscillation due to the carrier signal 8,11 is determined by the 90°-filter 13 and produces for resonance of the oscillatable unit 4 a phase shift of +90°. The much smaller modulation oscillation 9,12 is, however, not phase-shifted by the filter 13. Within the AGC 14, the received signal 10 (signal e) is then freed of the modulation oscillation 9,12 and becomes again the excitation carrier signal (signal a). The manipulated variable of the AGC 14 (signal f) comprises now exclusively the received modulation signal 12 (signal f). The phase shift between the excitation modulation signal 9 (signal b) and the received modulation signal 12 (signal f) is ascertained by a phase meter 17 and fed to a phase evaluation unit 18, which from the phase shift between the excitation modulation signal 9 (signal b) and the received modulation signal 12 (signal f) taking into consideration the excitation modulation frequency $f_M$ ascertains the damping, and from the damping, for example, the viscosity.

A second variant for an electronics unit of the invention 6" is the subject matter of FIG. 4. The oscillatory circuit for assuring resonant oscillations of the oscillatable unit 4 is unchanged, so that this aspect is not described again. The difference compared with FIG. 3 is that the excitation modulation frequency $f_M$ is now adjustable. Thus, only the circuit frequencies ω0 and ωM still enter into the evaluation. Moreover, such as already explained, a phase shift between the excitation modulation signal 9 (signal b) and the received modulation signal 12 (signal f) of 45° leads to a simplified formula for the viscosity. Therefore, besides the phase meter 17 and the phase evaluation unit 18 for determining the phase shift between the excitation modulation signal 9 (signal b) and the received modulation signal 12 (signal f), also a phase control circuit 19 is provided, in order to obtain an adjustable, desired phase (45°). Via the phase control loop 19, the excitation modulation frequency $f_M$ is set in such a manner that the phase shift between the excitation modulation signal 9 and the received modulation signal 11 amounts to 45°. From the measured resonant frequency ω0, which corresponds to the excitation carrier frequency $f_C$, and the set excitation modulation frequency ωM, the damping is then obtained.

LIST OF REFERENCE CHARACTERS 1 vibronic sensor
2 medium
3 container
4 oscillatable unit
5 electromechanical transducer unit
6 electronics unit
7 excitation signal
8 excitation carrier signal
9 excitation modulation signal
10 received signal
11 received carrier signal
12 received modulation signal
13 90°-filter and amplifier
14 AGC
15 D/A converter
16 A/D converter
17 phase meter
18 phase evaluation unit
19 phase control unit
$U_E$ excitation signal
$U_R$ received signal
$f_C$ excitation carrier frequency
$f_M$ excitation modulation frequency
D damping
ω0 resonant frequency of the undamped oscillator
ωM frequency of the modulation
ωC carrier frequency
V amplification of the resonator at w=0
AmpC excitation amplitude of the carrier frequency
Mo modulation amplitude

The invention claimed is:

1. An apparatus for determining and monitoring at least a first process variable of a medium, comprising:
   an electronics unit; and
   a mechanically oscillatable sensor unit,
   wherein the electronics unit is embodied to supply the sensor unit with an excitation signal composed of an excitation carrier signal having an excitation carrier frequency and an excitation modulation signal having an excitation modulation frequency and to receive from the sensor unit a received signal composed of a received carrier signal and a received modulation signal,
   and wherein the electronics unit is further embodied to measure a phase shift between the excitation modulation signal and the received modulation signal and to determine from the phase shift the first process variable.

2. The apparatus as claimed in claim 1, wherein the electronics unit is further embodied to determine from the received carrier signal at least a second process variable.

3. The apparatus as claimed in claim 1, wherein the sensor unit includes a mechanically oscillatable fork, a single rod, or a membrane.

4. The apparatus as claimed in claim 1, wherein the electronics unit is further embodied to determine and to monitor a predetermined fill level, a density or a viscosity of the medium.

5. The apparatus as claimed in claim 1, wherein the electronics unit is further embodied to control a phase shift between the excitation carrier signal and the received carrier signal to a predetermined value.

6. The apparatus as claimed in claim 1, wherein the electronics unit is further embodied to ascertain a damping from the phase shift between the excitation modulation signal and the received modulation signal.

7. The apparatus as claimed in claim 6, wherein the electronics unit is further embodied to ascertain from the damping at least a viscosity of the medium.

8. The apparatus as claimed in claim 1, wherein the electronics unit is further embodied to control the phase shift between the excitation modulation signal and received modulation signal to 45° by adjusting the excitation modulation frequency.

9. A method for determining and monitoring a first process variable of a medium, comprising:
   providing an electronics unit and a sensor unit;
   supplying from the electronics unit to the sensor unit an excitation signal composed of an excitation carrier signal having an excitation carrier frequency and an excitation modulation signal having an excitation modulation frequency;
   receiving by the electronics unit from the sensor unit a received signal composed of a received carrier signal and a received modulation signal; and
   determining from a phase shift between the excitation modulation signal and the received modulation signal the first process variable.

10. The method as claimed in claim 9, further comprising:
   determining from the received carrier signal at least a second process variable.

11. The method as claimed in claim 9, wherein the first process variable is a predetermined fill level, a density of the medium, or a viscosity of the medium.

12. The method as claimed in claim 9, further comprising:
   controlling a phase shift between the excitation carrier signal and received carrier signal to a predetermined value.

13. The method as claimed in claim 9, further comprising:
   determining a damping from the phase shift between the excitation modulation signal and the received modulation signal.

14. The method as claimed in claim 13, wherein at least a viscosity of the medium is ascertained from the damping.

15. The method as claimed in claim 9, further comprising:
controlling a phase shift between the excitation modulation signal and received modulation signal to 45° by adjusting the excitation modulation frequency.

* * * * *